(12) United States Patent
Hyun et al.

(10) Patent No.: US 11,246,057 B2
(45) Date of Patent: Feb. 8, 2022

(54) METHOD AND DEVICE FOR TRANSMITTING SIGNAL BY USING MULTIPLE LINKS

(71) Applicant: SAMSUNG ELECTRONICS CO., LTD., Suwon-si (KR)

(72) Inventors: Dowon Hyun, Seoul (KR); Hanseok Kim, Seoul (KR); Dongsook Kim, Suwon-si (KR); Abhishek Roy, Suwon-si (KR); Jeongwoong Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 460 days.

(21) Appl. No.: 16/303,914

(22) PCT Filed: May 25, 2017

(86) PCT No.: PCT/KR2017/005464
§ 371 (c)(1),
(2) Date: Nov. 21, 2018

(87) PCT Pub. No.: WO2017/204575
PCT Pub. Date: Nov. 30, 2017

(65) Prior Publication Data
US 2020/0322841 A1 Oct. 8, 2020

(30) Foreign Application Priority Data
May 25, 2016 (KR) .................. 10-2016-0064297

(51) Int. Cl.
*H04W 72/12* (2009.01)
*H04W 76/15* (2018.01)
(Continued)

(52) U.S. Cl.
CPC ........... *H04W 28/06* (2013.01); *H04W 72/12* (2013.01)

(58) Field of Classification Search
CPC ............... H04W 28/06; H04W 72/12; H04W 72/1263; H04W 76/15; H04W 88/06; H04W 88/10
See application file for complete search history.

(56) References Cited

U.S. PATENT DOCUMENTS

2013/0083783 A1 4/2013 Gupta et al.
2015/0257051 A1 9/2015 Rao et al.
(Continued)

OTHER PUBLICATIONS

Sachs, et al, Multi-access Management in Heterogeneous Networks, Wireless Pers Commun, 48:7-32, 2009, 26 pages (Year: 2009).*
(Continued)

*Primary Examiner* — Kent Krueger
(74) *Attorney, Agent, or Firm* — Sughrue Mion, PLLC

(57) ABSTRACT

The purpose of the present invention is to provide a method and a device for efficiently supporting multi-link transmission regardless of the type of RAT and the types of protocols. The present invention provides a method for aggregating links in an IP layer, and a method by which a multi-packet gateway transmits a packet comprises: confirming information on a link available for a terminal; scheduling a received data packet on the basis of the information on the available link; and transmitting the data packet, wherein the data packet is distributed so as to be transmitted by using the available link.

14 Claims, 25 Drawing Sheets

(51) Int. Cl.
*H04W 88/06* (2009.01)
*H04W 88/10* (2009.01)
*H04W 28/06* (2009.01)

(56) References Cited

U.S. PATENT DOCUMENTS

| | | | | |
|---|---|---|---|---|
| 2015/0351079 | A1* | 12/2015 | Himayat | H04W 28/08 370/329 |
| 2016/0174107 | A1* | 6/2016 | Kanugovi | H04W 28/0247 370/236 |
| 2016/0285746 | A1* | 9/2016 | Parron | H04L 45/245 |
| 2017/0171060 | A1* | 6/2017 | Liu | H04L 67/32 |
| 2018/0014346 | A1* | 1/2018 | Gupta | H04W 28/18 |
| 2018/0092147 | A1* | 3/2018 | Pelletier | H04W 76/15 |
| 2018/0146487 | A1* | 5/2018 | Zhu | H04L 47/2408 |

OTHER PUBLICATIONS

Anonymous, "3rd Generation Partnership Project; Technical Specification Group Services and System Aspects; Feasibility Study on New Services and Markets Technology Enablers—Network Operation; Stage 1 (Release 14)", Mar. 2016, 3rd Generation Partnership Project, 3GPP TR 22.864 V1.0.0, 26 pages total.

Anonymous, "Multi-RAT RAN and CN", Apr. 2016, Qualcomm Incorporated, 3GPP TSG-RAN WG3 Meeting #91 bis, R3-160823, 5 pages total.

Anonymous, "Aggregation scenarios for NR", Apr. 2016, Qualcomm Incorporated, R3-160826, 3GPP TSG-RAN WG2 Meeting #91 bis, 5 pages total.

Anonymous, "Further Consideration on Radio Aggregation Between NextGen RAN and eNB", Apr. 2016, ZTE, R3-160788, 3GPP TSG RAN WG3 Meeting#91 bis, 6 pages total.

Search Report dated Aug. 24, 2017, issued by the International Searching Authority in counterpart International Patent Application No. PCT/KR2017/005464 (PCT/ISA/210).

Written Opinion dated Aug. 24, 2017, issued by the International Searching Authority in counterpart International Patent Application No. PCT/KR2017/005464 (PCT/ISA/237).

* cited by examiner

METHOD AND DEVICE FOR TRANSMITTING SIGNAL BY USING MULTIPLE LINKS

TECHNICAL FIELD

The present invention relates to a method and apparatus for transmitting packets over multiple links of different communication technologies.

BACKGROUND ART

Carrier aggregation and dual connectivity specified in the long term evolution (LTE) standard and multipath transmission control protocol (TCP) for supporting carrier aggregation over TCP are existing multilink transfer technologies. Such technologies are limited in their ability to aggregate only radio access technologies (RATs) or only TCP flows.

DISCLOSURE OF INVENTION

Technical Problem

In order to overcome such limitation, the present invention aims to provide a method and apparatus for supporting multilink transmission efficiently regardless of the type of RAT and protocol.

Solution to Problem

In accordance with an aspect of the present invention, a packet transmission method of a multilink gateway includes obtaining information on links available for a terminal, scheduling data packets received based on the information on the links available for the terminal, and transmitting the data packets, wherein the data packets being distributed to available links for transmission thereover. Preferably, the method further includes determining whether the terminal supports multilink transmission, and scheduling the data packets includes calculating weights for respective links based on state information of the available links and scheduling the data packets based on the weights.

In accordance with another aspect of the present invention, a multilink gateway for transmitting packets includes a transceiver configured to transmit and receive a signal and a controller configured to control to obtain information on links available for a terminal, schedule data packets received based on the information on the links available for the terminal, and transmit the data packets, wherein the data packets being distributed to available links for transmission thereover. Preferably, the controller is configured to control to determine whether the terminal supports multilink transmission, calculate weights for respective links based on state information of the available links, and schedule the data packets based on the weights.

Advantageous Effects of Invention

The packet transmission method of the present invention is advantageous in terms of flexible network extension, link-adaptive packet transmission, and transmission reliability enhancement by enabling efficient multilink transmission regardless of RAT and protocol.

MODE FOR THE INVENTION

Figure 1:
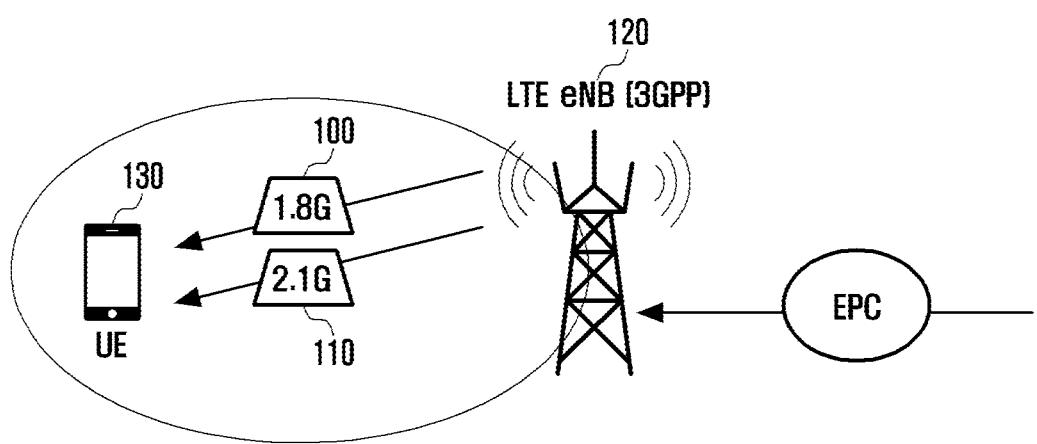
FIG. 1 is a diagram for explaining the LTE CA technology.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Also, it will be understood by those skilled in the art that the present invention can be applied even to other communication systems having a similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein; these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Examples of existing multilink technologies include carrier aggregation (CA), dual connectivity (DC), and LTE-Wi-Fi aggregation (LWA) that are employed in LTE standardized by the $3^{rd}$ generation partnership project (3GPP), and multi-path TCP (MPTCP) for aggregating TCP connections on the TCP layer that is standardized by Internet engineering task force (IETF).

FIG. 1 is a diagram for explaining the LTE CA technology. In reference to FIG. 1, an evolved Node B (eNB) 120 may serve a user equipment (UE) 130 using carrier 1 100 of 1.8 GHz band and carrier 2 110 of 2.1 GHz simultaneously. The CA is a technology introduced in LTE to aggregate carriers of one radio access technology (RAT).

Figure 2:
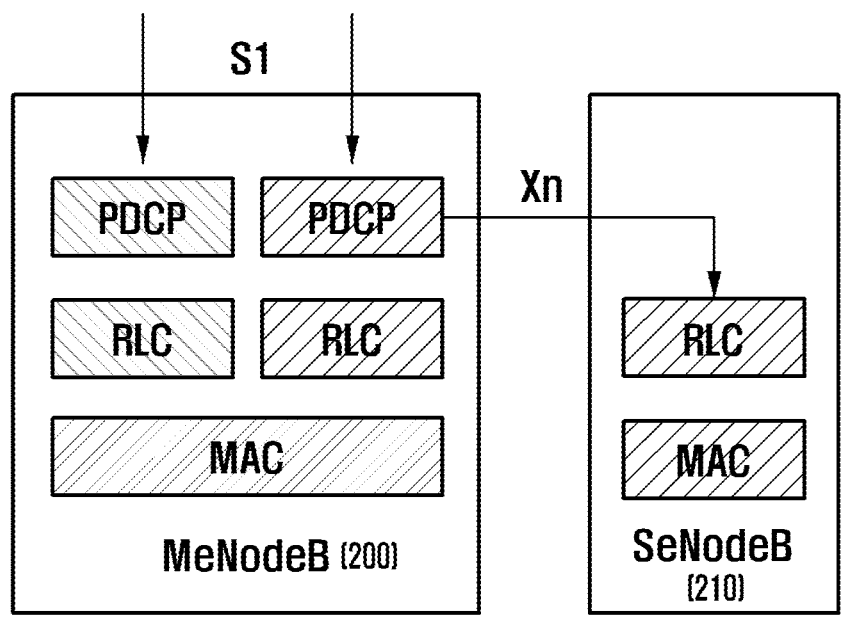
FIG. 2 is a diagram for explaining the LTE dual connectivity technology.

FIG. 2 is a diagram for explaining the LTE dual connectivity technology. In reference to FIG. 2, a bear is split over a master eNB (MeNB) 200 and a secondary eNB (SeNB) 210. The dual connectivity or LTE RAT-based CA may be collectively referred to as intra-RAT CA.

Meanwhile, the LTE-Wi-Fi aggregation is an inter-RAT CA for aggregating LTE and Wi-Fi (wireless local area (LAN) technology standardized under the institute of electrical and electronics engineers (IEEE) 802.11 standard) carriers.

Figure 3:
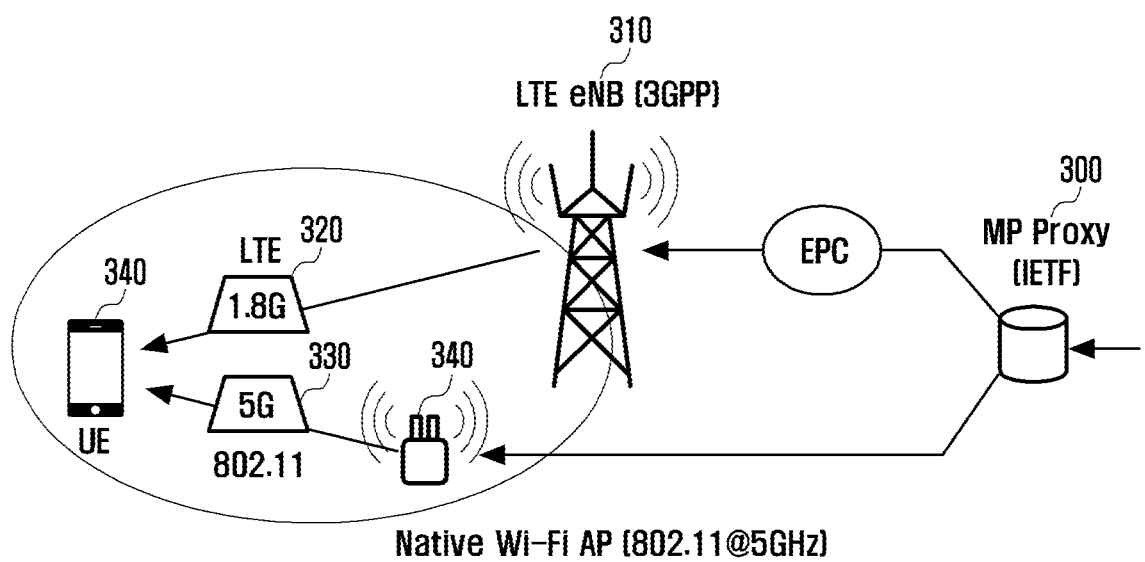
FIG. 3 is a diagram for explaining the MPTCP technology.

FIG. 3 is a diagram for explaining the MPTCP technology. In reference to FIG. 3, an MP proxy 300 establishes subflows with multiple IP addresses, of which one subflow carries a service to a UE 340 via an eNB 310 of an LTE network operating on a carrier in the 1.8 GHz band. Another subflow carries the service to the UE 340 via an access point (AP) 340 of a Wi-Fi (802.11) network operating on a carrier in the 5 GHz band. That is, the MPTCP is an inter-RAT CA technology being implemented on the TCP layer.

The CA and the dual connectivity of LTE standard are a kind of intra-RAT CA and thus have a drawback of requiring change of configuration of the current eNBs in order to enable multilink transmission regardless of RAT and protocol. These technologies also have a drawback of the lack of forward compatibility because certain communication technologies that may be employed in the 5G system cannot be accommodated in the current infrastructure. In the case of using the LTE CA, if the number of secondary carriers increases, a problem arises in that the resources for use in the master carrier decreases. Particularly in the case of the dual connectivity which brings about data and control information exchange over a backhaul link, the increased backhaul traffic is likely to cause overload in the mobile communication network. Meanwhile the MPTCP makes it possible to implement a multilink transmission technology, but its aggregation capability is limited to TCP flow aggregation. In order to implement an RAT-transparent and protocol-transparent link aggregation technology, it is necessary to configure a multi-RAT/multi-vendor network and, although such a network is configured, a problem arises in difficulty of performing multilink transmission promptly because of the interworking complexity of different networks.

The present invention aims to provide a system and method for enabling RAT-transparent and protocol-transparent multilink transmission unlike legacy technologies. In order to achieve this, multiple links are established on the Internet Protocol (IP) layer. Establishing multiple links on the IP layer has advantages as follows. First, since the multiple links are shown as a single flow on the upper layers, it is possible to obtain a multilink gain with no modification of all applications at all. Second, it is possible to establish multiple links regardless of the type of network (or RAT) on the lower layer. For example, it is possible to establish multiple links regardless of type of networks such as 5G communication network, LTE network, Wi-Fi network, and other networks based on the technologies to be developed in the future. Third, it is possible to increase the system throughput by controlling the multiple links in consideration of the characteristics of the multilink transmission and traffic and/or services, improve communication reliability by means of a multilink gateway, and facilitate integrated policy and charging control.

Figure 4:
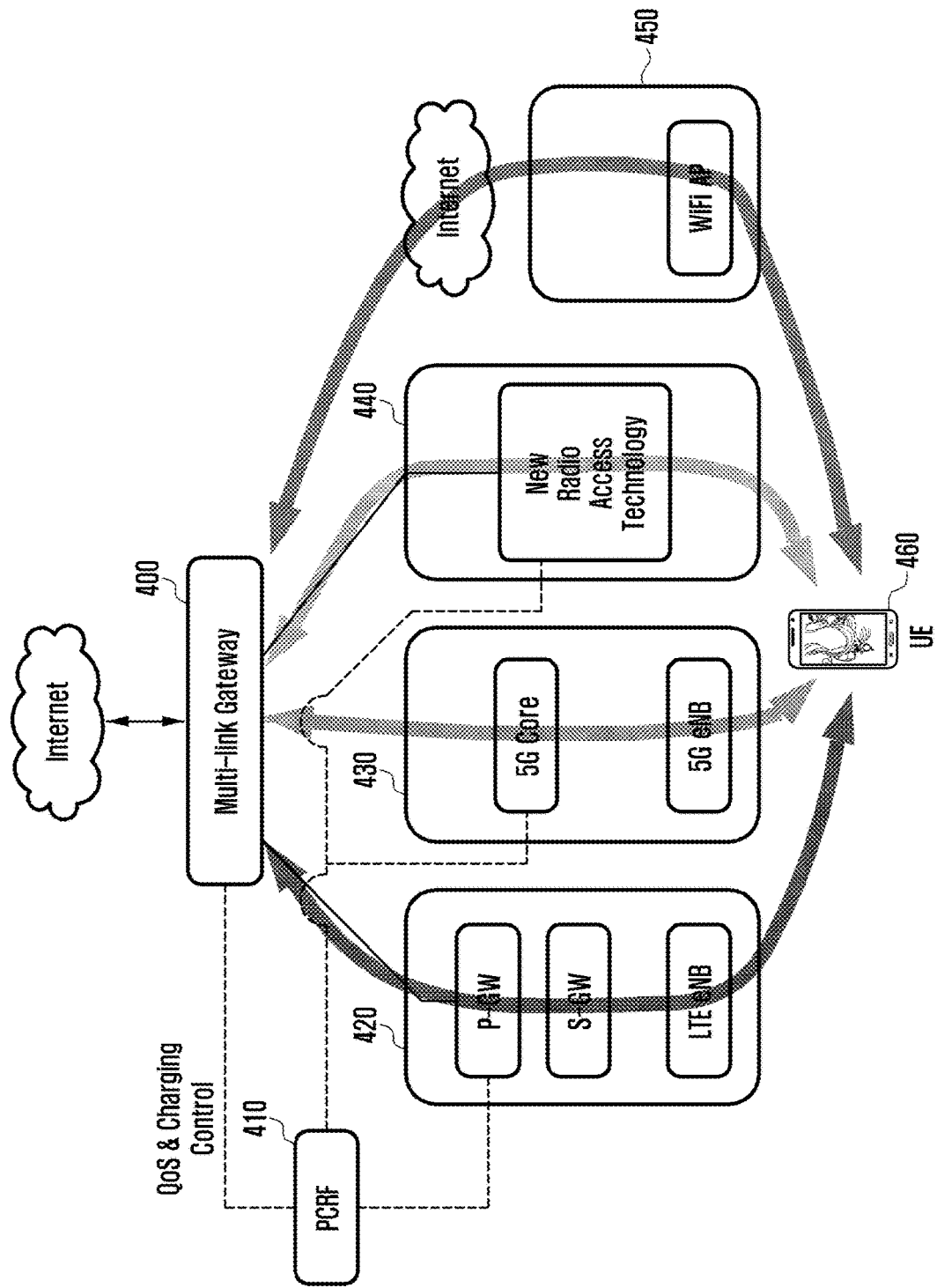
FIG. 4 is a diagram illustrating an overview of a system of the present invention.

FIG. 4 is a diagram illustrating an overview of a system of the present invention.

As shown in FIG. 4, a multilink gateway (ML-GW) is required for implementing an aggregation function on the IP layer according to the present invention. The ML-GW may be collocated with any of a serving gateway (S-GW) and a packet data network (PDN) gateway (P-GW). Such a gateway function may be provided as part of the legacy gateway or implemented with a network entity that is physically independent from the legacy gateway.

The ML-GW 400 provides the UE 460 with a service via an LTE link 420, a 5G communication link 530, a new RAT link 440, and a Wi-Fi link 450. Also, a policy and charging rules function (PCRF) which is responsible for QoS and charging management and control as a network entity of the legacy LTE system may be connected to the LTE link 420, the 5G communication link 530, the new RAT link 440, and the Wi-Fi link 450 to perform integrally the QoS and charging management and control function, which may be performed by an entity equivalent in function with the PCRF.

Figure 5:
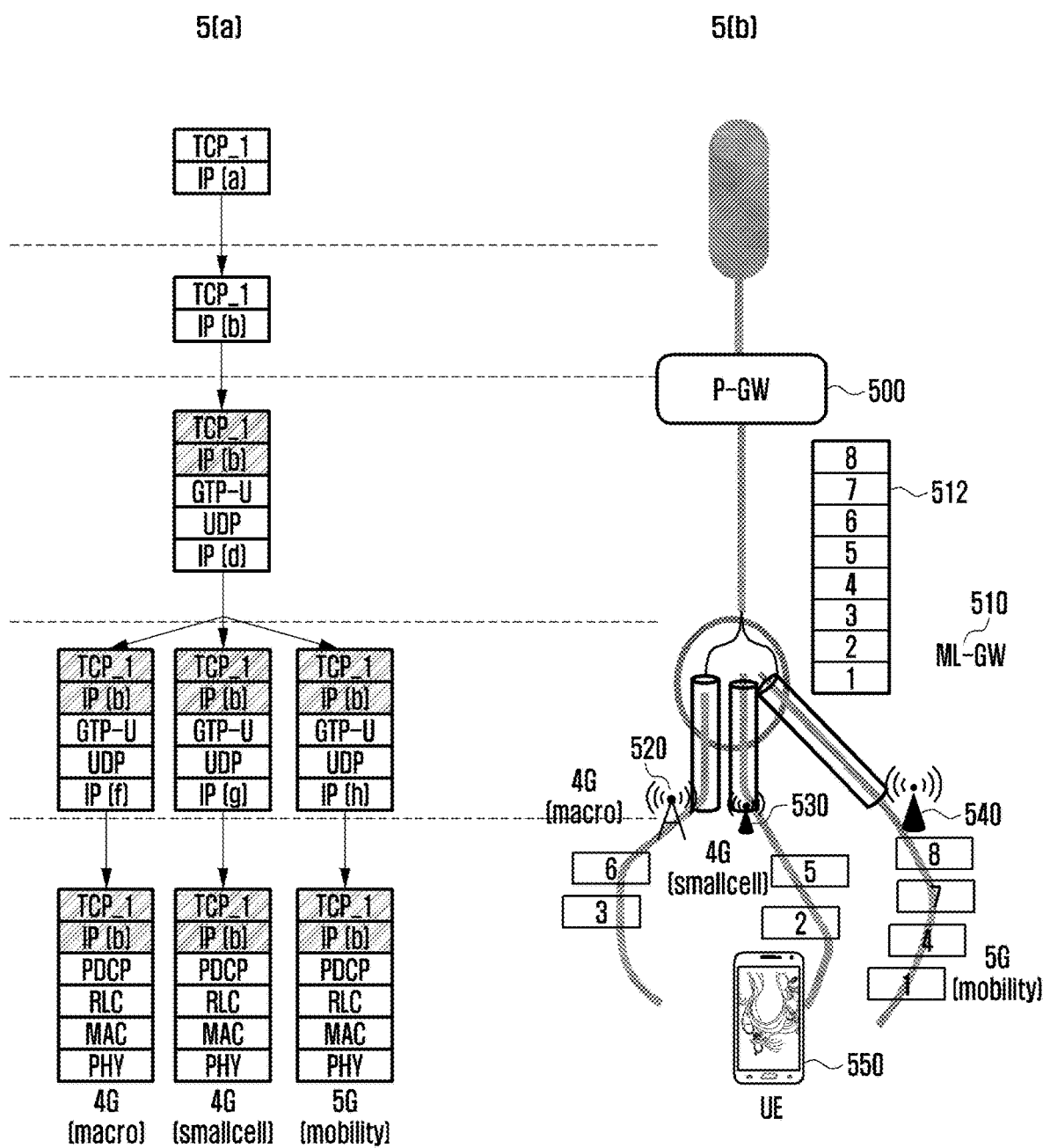
FIG. 5 is a diagram for explaining a multilink transmission method according to an embodiment of the present invention.

FIG. 5 is a diagram for explaining a multilink transmission method according to an embodiment of the present invention. In this embodiment, the ML-GW is collocated with an S-GW by way of example but its location is not limited thereto.

In reference to part (b) of FIG. 5, the data packets 1 to 8, as denoted by reference number 512, arrived from the P-GW are distributed to the links connected to a UE 550. The UE 550 has a $4^{th}$ generation (4G) communication link 520 to a MeNB, a 4G communication link 530 to an SeNB, and a 5G mobile communication link 540 to a 5G mobile communication base station, and the ML-GW distributed the arriving data packets in order of links 540, 530, and 520. Although the packets are distributed in a specific order of links by way of example in part (b) of FIG. 5, the packet distribution order is not limited thereto. As a consequence, data packet 1 is transmitted to the UE 550 on the link 540, data packet 2 is transmitted to the UE 550 on the link 550, and data packet 3 is transmitted to the UE 550 on the link 520. The data packets 4 to 6 are also transmitted to the UE on the corresponding data links and, in part (b) of FIG. 5, the data packets 7 and 8 are transmitted to the UE 550 on the 5G mobile communication link 540.

Part (a) of FIG. 5 shows protocol layers operations at respective entities depicted in part (b) of FIG. 5. The P-GW 500 and other higher level network entities process data packets on the TCP and IP(a) and IP(b) layers, the P-GW 500 and ML-GW 510 process data packets on the TCP to IP(d) layers, the ML-GW 510 distributes the data packets to the respective links on the IP layer, and the respective links carry GPRS tunneling protocol-user data tunneling (GTP-U) packet, user datagram protocol (PDP) packets, and IP packets. Afterward, the MeNB, SeNB, and 5G mobile communication base station process the data packets on a packet data convergence protocol (PDCP) layer, a radio link control (RLC) layer, a medium access control (MAC) layer, and a physical layer, below the TCP and IP layers and transmit the processed data packet to the UE 550.

Figure 6:
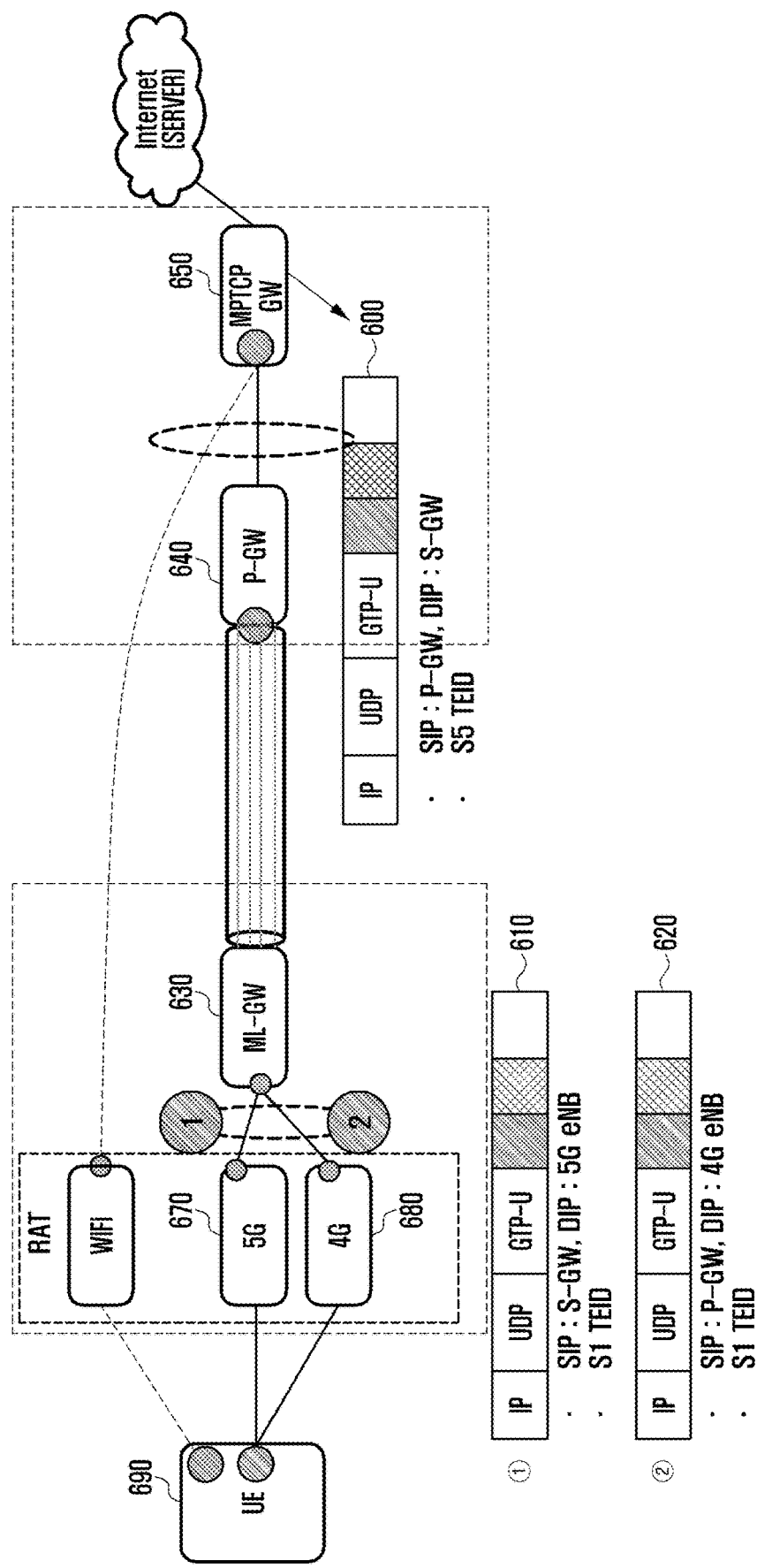
FIG. 6 is a diagram illustrating a multilink operation for processing a TCP flow according to an embodiment of the present invention.

FIG. 6 is a diagram illustrating a multilink operation for processing a TCP flow according to an embodiment of the present invention. Although the ML-GW is collocated with the S-GW by way of example in this embodiment, the present invention is not limited to this embodiment.

In reference to FIG. 6, a UE 690 may receive a service in such a way that an MPTCP gateway 650 transmits data packets to the UE 690 via a Wi-Fi link. This link is a subflow split on the TCP layer and it may be provided via the MMPCT technology or omitted. The MPTCP gateway 650 may also transmit a data packet to the P-GW 640. The data packet being transmitted through the Wi-Fi link and from the MPTCP gateway 650 to the P-GW 640 may be configured as denoted by reference number 600. In this case, the data packet includes an IP header, a UDP header, a GTP-U header, the address of the P-GW as the source IP (SIP) address, the address of the S-GW as the destination IP (DIP) address, and S5 tunnel ID (TEID).

The P-GW 640 transmits the data packet to the S-GW, and the ML-GW 630 collocated with the S-GW transmits the data packet to the UE 690 via the 5G and 4G RAT links. That is, the ML-GW 630 distributes the data packet (interchangeable referred to as payload) to a 5G base station 670 and a 4G base station 680. The data packet being transmitted from the ML-GW 630 to the 5G base station 670 has a structure as denoted by reference number 610. In this case, the data packet includes the address of the S-GW as its source IP address, the address of the 5G base station as its destination IP address, and the S1_5 G TEID. Also, the data packet being transmitted from the ML-GW 630 to the 4G base station 680 has a structure as denoted by reference number 620. In this case, the data packet includes the address of the S-GW as its source IP address, the address of the 4G base station as its destination IP address, and the S1_4 G TEID. In the case of the TCP flow, the packet is transmitted over all the types of links regardless of RT and protocol in service, which brings link aggregation effect; the TCP layer distributes traffic based on acknowledgement (ACK) as to be described hereinbelow.

Figure 7:
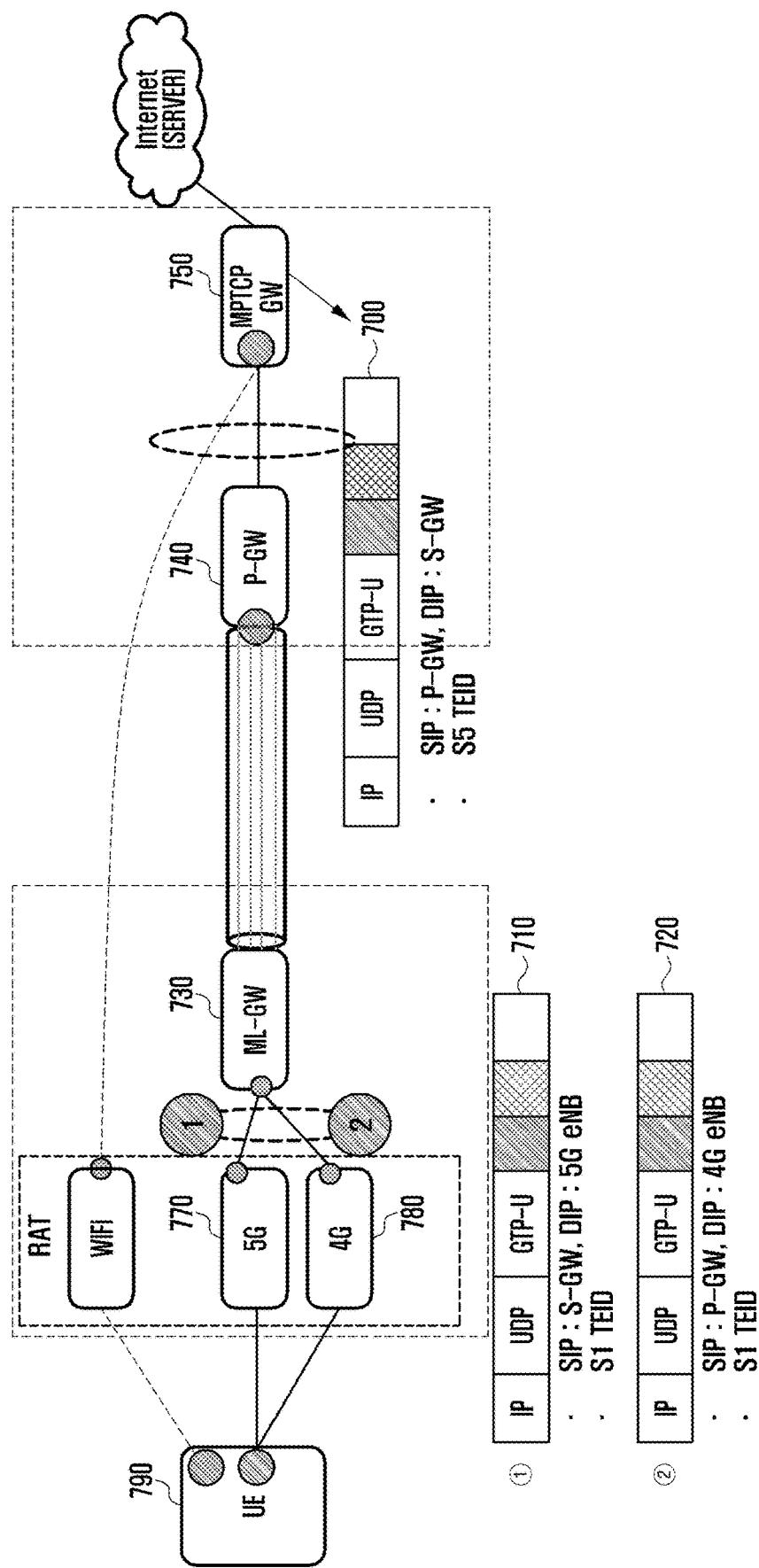
FIG. 7 is a diagram illustrating a multilink operation for processing a real-time transport protocol (RTP) flow according to an embodiment of the present invention.

FIG. 7 is a diagram illustrating a multilink operation for processing a real-time transport protocol (RTP) flow according to an embodiment of the present invention. Such a flow processing is applicable to delay-sensitive data packets carrying real-time service such as voice over IP (VoIP, IP telephony technology) and voice over LTE (VoLTE, LTE standard-based voice communication). It may also be applicable to a UDP flow. In this case, the ML-GW may be collocated with the S-GW by way of example but not limited thereto.

In reference to FIG. 7, the UE 790 may receive a service in such a way that an MPTCP gateway 750 transmits data packets to the UE 790 via a Wi-Fi link. This link is a subflow split on the TCP layer and it may be provided via the MMPCT technology or omitted. The MPTCP gateway 750 may also transmit a data packet to the P-GW 740. The data packet being transmitted through the Wi-Fi link and from the MPTCP gateway 750 to the P-GW 740 may be configured as denoted by reference number 700. In this case, the data packet includes an IP header, a UDP header, a GTP-U header, the address of the P-GW as the source IP (SIP) address, the address of the S-GW as the destination IP (DIP) address, and S5 tunnel ID (TEID).

The P-GW 740 transmits the data packet to the S-GW, and the ML-GW 730 collocated with the S-GW transmits the data packet to the UE 790 via the 5G and 4G RAT links. That is, the ML-GW 730 distributes the data packet (interchangeable referred to as payload) to a 5G base station 770 and a 4G base station 780. The ML-GW 730 may switch the data packet from the 5G base station 770 to the 4G base station 780. In the case of the handover of the terminal, it may be possible to transmit the data packet via a RAT link which is not involved in the handover to prevent the data packet flow from being broken. This makes it possible to protect against the packet transmission interruption occurring during an intra-RAT handover, resulting in improvement of voice communication quality.

The data packet being transmitted from the ML-GW 730 to the 5G base station 770 has a structure as denoted by reference number 710. In this case, the data packet includes the address of the S-GW as its source IP address, the address of the 5G base station as its destination IP address, and the S1_5 G TEID. Also, the data packet being transmitted from the ML-GW 730 to the 4G base station 780 has a structure as denoted by reference number 720. In this case, the data packet includes the address of the S-GW as its source IP address, the address of the 4G base station as its destination IP address, and the S1_4 G TEID.

Figure 8A:
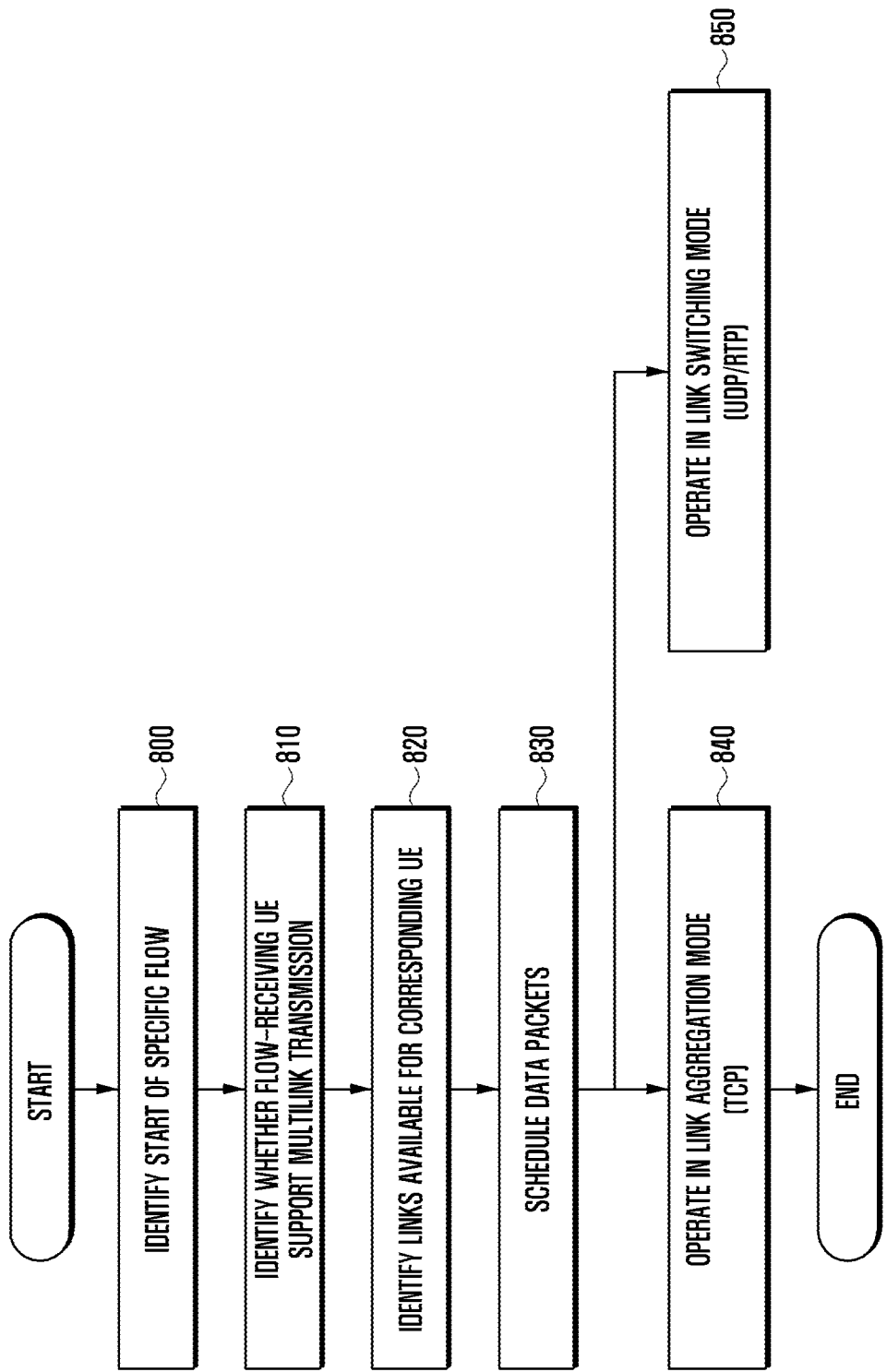
FIG. 8A is flowchart illustrating an operation of an ML-GW according to an embodiment of the present invention.

FIG. 8A is a flowchart illustrating an operation of an ML-GW according to an embodiment of the present invention.

In reference to FIG. 8A, the ML-GW detects a new incoming packet flow at step 800 and determines whether a UE as the receiver of the flow supports multilink transmission at step 810. In order to receive signals over multiple links, the UE has to support multiple links or interfaces with a single IP address. The ML-GW determines whether the UE is capable of processing the signals transmitted over multiple links based on the UE capability information reported by the UE or provided by another network entity. If the UE has the multilink capability, the ML-GW checks the links available for the UE at step 820. The ML-GW may ascertain the bearers established for the UE based on the information about the access network to which the UE is connected. Although it does not know the RATs that a UE supports, the ML-GW may check the number of links available for the UE. Next, the ML-GW schedules, at step 830, the incoming data packets in consideration of per-link characteristics every n time slots on the available links. Particularly according to the characteristics of the flows, the ML-GW may operate in a link aggregation mode for TCP flows at step 840 or a link switching mode for RTP (or UDP) flows at step 850. Since the characteristics of the links are unknown at the initial stages of the flows, the ML-GW perform a fair scheduling to distribute data packets fairly. Once it ascertains the link characteristics, the ML-GW perform a weighted fair scheduling by reflecting the weights determined based on the link characteristics to the corresponding links. Particularly, this operation may be applied to the TCP flows. In order to minimize the operation overhead, it may be necessary to minimize the division operations (divide, /).

Figure 8B:
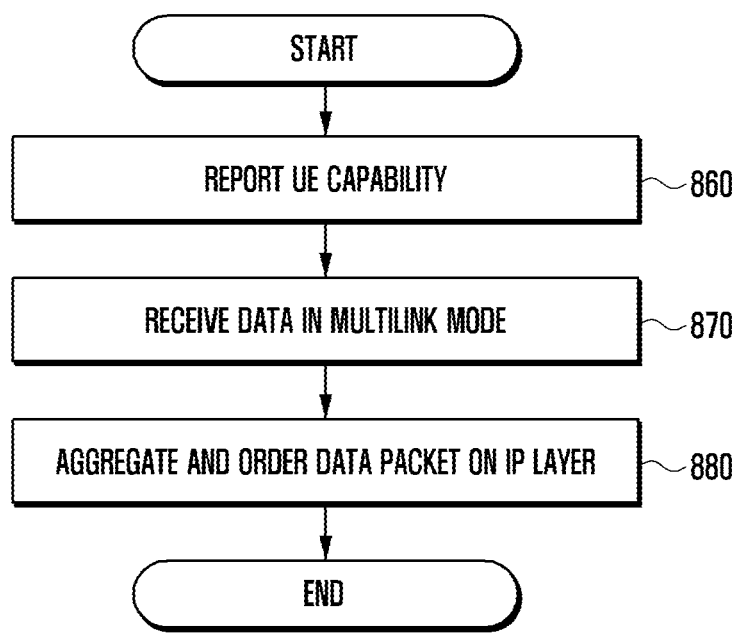
FIG. 8B is a flowchart illustrating an operation of a UE according to an embodiment of the present invention.

FIG. 8B is a flowchart illustrating an operation of a UE according to an embodiment of the present invention.

In reference to FIG. 8B, the UE may transmit UE capability information to the ML-GW at step 860, the UE capability information indicating whether the UE supports multilink transmission. The UE may also transmit other information necessary for multilink transmission such as information on the links available for use by the UE. Next, the UE receives data packets at step 870 in a multilink mode under the control of the ML-GW. Here, the data packets may be received via various RATs links. At step 880, the UE aggregates and orders the data packets received via various RATs.

Table 1 elaborates an algorithm for distributing data packets on TCP flows.

TABLE 1

Algorithm
Calculate every n slot s. n with unit of ms
Input : Si(n): number of TCP data packets transmitted on interface i,
Ri(n):number of received TCP
ACK packets
Output : Bi(n): number of backlogged packets on interface i
    Bi(n)= Si(n) − Ri(n)

It may be possible to UE the backlogged packets to ascertain the packet rate on each link between the ML-GW and the UE. The number of backlogged packets is calculated by subtracting the number of packets acknowledged by ACK from the number of packets transmitted on link (or interface) i as Equation 1.

$$Bi(n)=Si(n)-R(n) \quad \text{[Equation 1]}$$

Here, i denotes a number of links which UE is connected, n denotes scheduling time, $Si(n)$ denotes the total number of TCP data packets transmitted to the UE on link i since then, and $R(n)$ denotes the number of TCP ACK packets transmitted by the UE. Here, $R(n)$ is the total number of received ACK packets rather than the number of received ACK packets per link.

Table 2 elaborates an algorithm for calculating per-link weights for scheduling. The ML-GW performs the weighted fair scheduling with the calculated weight $Wi(n)$.

TABLE 2

Algorithm
calculate weight every start of n slots and use weight in corresponding slot
Input: Bi(n). N(total number of paths), Si(n), Ri(n)
Output: Wi(N): w, Pi(n), Pinit_i(n), Pmin
For i = 1 to N
    Bi(n) = Si(n) − Ri(n)
    Bi(n) = (1−α )*Bi(n−1) + α*Bi(n) // update Bi (n)
    If LFi == 0
        If Bi(n−1) => Bi(n) // update Wi(n)
            Wi(n) = Wi(n−1) + Bi(n)
        else // if Bi(n−1) < Bi(n)
            Wi(n) = Wi(n−1) − Bi(n)
        End if
    Else // if LFi == 1 // Link fail
        Wi(n) = Wi(n+1) // no update Wi(n)
    End if
End for
Descending sort to Pi(n) for Wi(n)
Pinit_i(n) = Pi(n) for initial value on scheduling
Pmin = min P(i)

Table 2 shows the algorithm for calculating the scheduling weights. The ML-GW calculate $Bi(n)$ for all links connected to a certain UE. Here, bi(n) may alleviate significant difference from the previous slot using the weight a.

If LFi is 0 (i.e., the link is in a normal state rather than a link failure state) and $Bi(n-1)=>Bi(n)$, this means that the number of backlogged packets has increased in the current slot in comparison with the previous slot (i.e., the link state has become good) and thus the ML-GW increases the weight for the corresponding link to $Wi(n)=Wi(n-1)+Bi(n)$ because the corresponding link has room for additional use. Whereas, in the case where the link is normal and $Bi(n-1)<Bi(n)$, this means that the number of backlogged packets has decreased in the current slot in comparison with the previous slot (i.e., the link state has become bad) and thus the ML-GW decreases the weight for the corresponding link to Win(n)=Wi(n−1)−Bi(n). If the LFi is 1, this means link failure on link i and thus the weight of the corresponding link is not increased.

If the Wi(n) is calculated for all links, the ML-GW prioritizes the links in the descending order of Wi(n), substitutes the corresponding value for Pi(n), and substitutes Pi(n) for Pini_i(n) for maintaining the initial value of Pi(n) for convenience of calculation afterward. The minimum value of Pi(n) is substituted for Pmin. Also, Wi(0) may be set to the same value for all links.

The link failure determination may be made based on the heartbeat of the stream control transmission protocol (SCTP) between the ML-GW and the base station by way of example.

Table 3 shows an algorithm for distributing packets using the calculated scheduling weight Pi(n).

TABLE 3

Algorithm
Input: Pi(n), N(Total # of paths ), C = N, Pmin
Output: packet tranmsission (sending packet)
For i = 1 to N
  if LFi == 0
    if Pi(n) => Pmin
      Send a packet on path i
      Pi(n) = Pi(n) − Pmin
    Else
      C = C − 1
    End if
  Else // if LFi == 1
    If Pi(n) => Pmin
      Do not -send a packet on path 1
      Pi(n) = Pi(n) − Pmin
    Else
      C = C − 1
    End if
  End if // LFi
  If C == 0
    For i = 1 to N
      Pi(n) = Pi(n) + Pinit_i(n)
    End for
    C = N
  End if
End for According to this algorithm, the ML-GW transmits packets on the links in the descending order of Pi(n) for all links i. Afterward, the ML-GW saves a value obtained by subtracting the value of Pmin from the value of Pi(n) as a new Pi(n). If the value of Pi(n) is less than the value of Pmin, C decrements by 1. This means that no more packets are transmitted on the corresponding link. If C is 0, this means that the weights have been consumed for all links and, thus, the ML-GW calculates weights newly.

Figure 9:
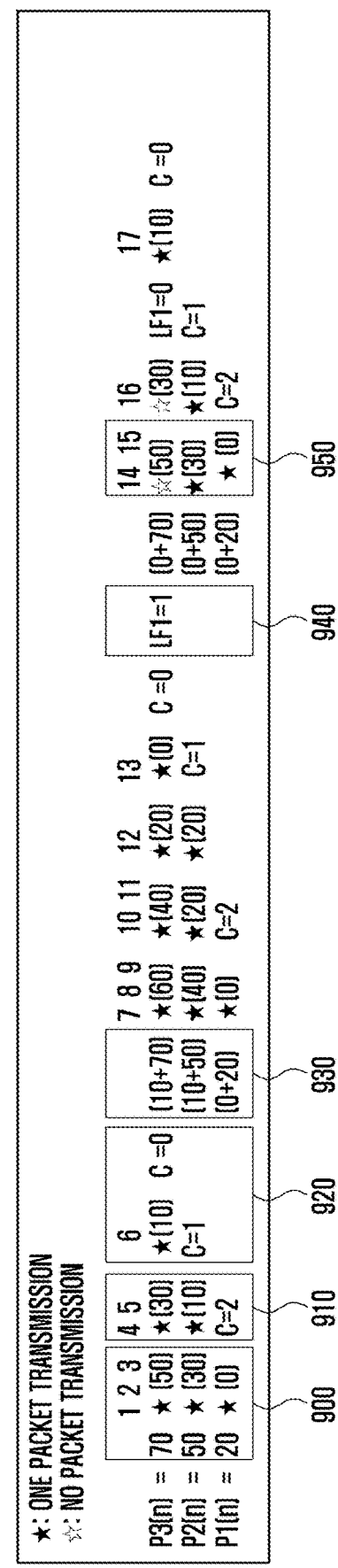
FIG. 9 is a diagram for explaining packet transmission based on the proposed algorithm according to an embodiment of the present invention.

FIG. 9 is a diagram for explaining packet transmission based on the proposed algorithm according to an embodiment of the present invention.

In reference to FIG. 9, there are 3 links (P1, P2, and P3) for a terminal, Pmin has the value of 20 equal to P3(n), and C=3. As denoted by reference number 900, under the assumption of P3(n)=70, P2(n)=50, and P3(n)=20, data packets 1, 2, and 3 are transmitted in the descending order of the value of P, i.e., P3, P2, and P1. Afterward, the values obtained by subtracting Pmin from the P3(n), P2(n), and P1(n) are newly stored as P3(n), P2(n), and P1(n), i.e., P3(n)=50, P2(n)=30, and P1(n)=0. Afterward, as denoted by reference number 910, data packets 4 and 5 are transmitted in the descending order of the value of P, i.e., P3 and P2, and, for P1, C is updated to 2 and then ss without data packet transmission because the value of P1(0) is less than the value of Pmin. Afterward, the values obtained by subtracting Pmin from P3(n) and P2(n) are newly stored as P3(n) and P2(n). At this time, P3(n) becomes 30 and P2(n) becomes 10. Afterward, as denoted by reference number 920, packet 6 is transmitted with P3, and C is updated to 1 and then stored because the P2(n) is less than Pmin. Then, P3(n) becomes 10, and C=1 is stored because P3(n) is less than Pmin. The remaining weight is stored as Pini_i(n) to be reflected to the next packet transmission.

If C=3 (i.e., the weights have been consumed for all links), new weights are added to the values of P for the respective links. Reference number 903 denotes a case where new weights are added such that P3 becomes 80 by summing P3(n) (i.e., 70) calculated by the algorithm and Pini_3 (n) (i.e., 10), P2 becomes 60 by summing P2(n) (i.e., 50) calculated by the algorithm and Pini_2 (n) (i.e., 10), and P1 becomes 20 by summing P1(n) (i.e., 20) calculated by the algorithm and Pini_1(n) (i.e., 0). The same process is repeated afterward.

If link failure occurs on a certain link (reference number 940 denotes a case where link failure is detected for P3), no packet is transmitted thereon and the Pi(n) is updated by a value obtained by subtracting Pmin therefrom. Reference number 950 denotes a case where the ML-GW does not transmit packet with P3 since link failure is detected for P3 and updates the value of P3(n) from 70 to 50 and saves the updated value.

Table 4 elaborates throughputs in cases of using eNB 1 having an access link with a data rate of 70 Mbps and eNB 2 having an access link with a data rate of 150 Mbps and shows that the employment of the proposed ML-GW makes it possible to achieve 85% of the ideal throughput.

TABLE 4

|  | Ideal aggregated throughput | MLGW Aggregated throughput |
| --- | --- | --- |
| eNB 1 + eNB 2 | 225 Mbps | 190 Mbps |
| eNB 2 + eNB 2 | 300 Mbps | 255 Mbps |

Figure 10:
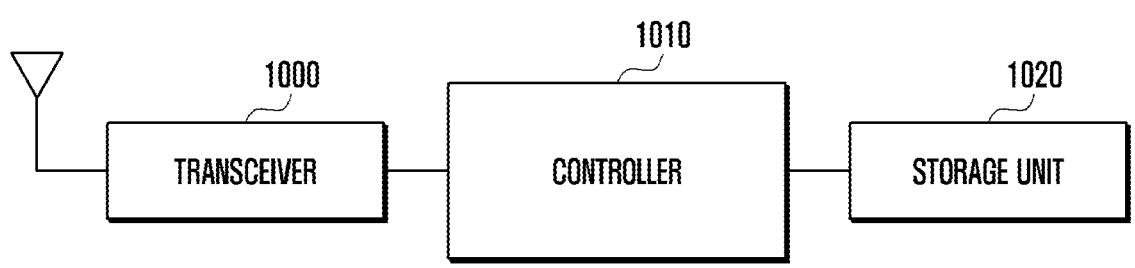
FIG. 10 is a block diagram illustrating a configuration of an ML-GW according to an embodiment of the present invention.

FIG. 10 is a block diagram illustrating a configuration of an ML-GW according to an embodiment of the present invention.

In reference to FIG. 10, the ML-GW includes a transceiver 1000, a controller 1010, and a storage unit 1020. The ML-GW may be collocated with an S-GW or another network entity or deployed as an independent network entity physically separated therefrom.

The transceiver 1000 communicates data packet and control information with other network entity or a terminal, and the controller 1010 checks flows to a specific UE, determines whether the corresponding UE supports multi-link transmission, identifies the links available for the UE, performs scheduling on the received data packet, and control the transceiver 1000 and the storage unit 1020 to transmit the data packets according to the scheduling result. The storage unit 1020 may store the received data packets and outputs the data packets according to the scheduling result.

Figure 11:
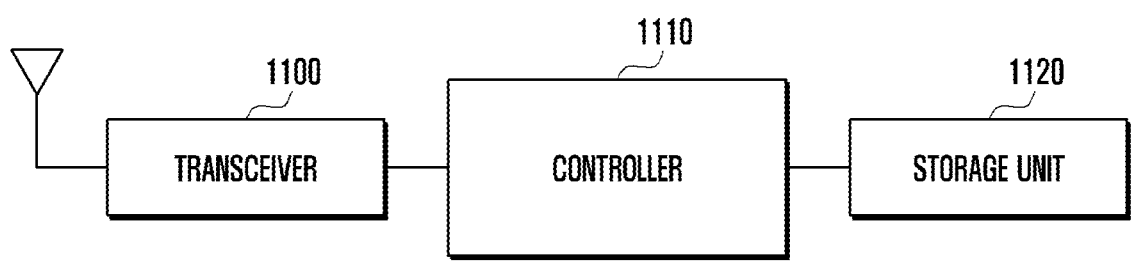
FIG. 11 is a block diagram illustrating a configuration of a UE according to an embodiment of the present invention.

FIG. 11 is a block diagram illustrating a configuration of a UE according to an embodiment of the present invention.

In reference to FIG. 11, the UE includes a transceiver 1100, a controller 1110, and a storage unit 1120. The transceiver may support various types of RATs for communicating data packets and control information with RAT-specific base stations and APs. The data packets are scheduled by the ML-GW. The controller 1110 controls the transceiver 1100 to transmit and receive data packet and control information and aggregates and orders data packets received on various links. The controller 1110 also control the storage unit 1120 to store the data packets. The storage unit 1120 stores and outputs the data packets.

Figure 12A:
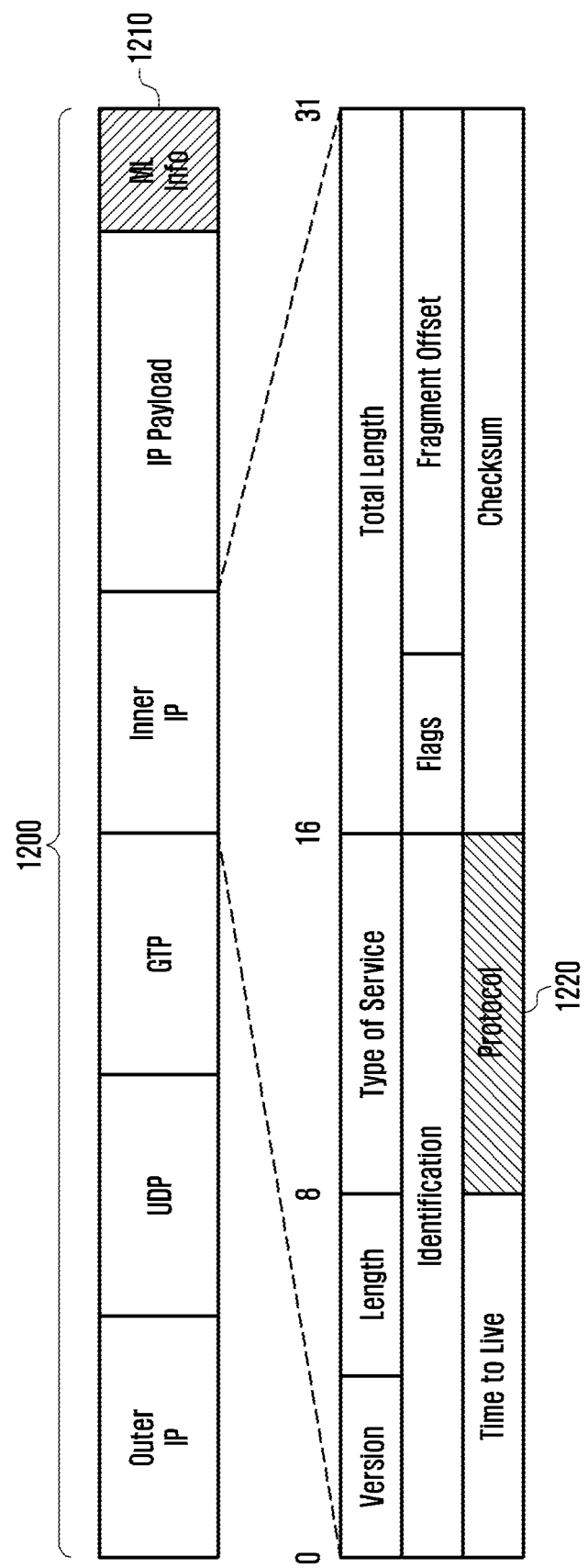
FIG. 12A is a diagram illustrating a position of ML information in IP payload according to an embodiment of the present invention.

According to an embodiment of the present invention, a new multilink information protocol is defined for TCP flow aggregation and UDP flow switching. Because the IP layer is not used for exchanging link state and link feedback information, the multilink information (hereinafter, ML information) may include the information on the link state. the ML information may be arranged at the end of the IP payload. FIG. 12A is a diagram illustrating a position of ML information in IP payload. As shown in FIG. 12A, the ML information 1210 is located at the end of the entire payload 1200, and an inner IP header may include a protocol field 1220.

Such a position of the ML information is advantageous in terms of 1) being transmitted with modification of the current LTE protocol stack and 2) reducing power consumption necessary for processing the information. If the ML information is located in a PDCP header or between the PDCH header or an IP header, this means a modification the current LTE protocol stack or robust header compression (ROHC) and thus increases power consumption in processing the modified payload; for this reason, it is advantageous to locate the ML information at the end of the whole payload.

In this case, a problem arises in that it is difficult to ascertain the ML information on the IP layer and, in order to overcome this problem, a next protocol field 1220 of the inner IP header may be set to a new value.

TABLE 5

| Protocol field value | Protocol |
|---|---|
| 200 | TCP + 2 Bytes Multi-Link Info |
| 201 | UDP + 1 Byte Multi-Link Info |
| 202 | 1 Byte Multi-Link Info |

In reference to FIG. 5, the protocol field is set to 200 for indicating the next protocol of TCP and 2-byte ML information in the payload, 201 for indicating the next protocol of UDP and 1-byte ML information in the payload.

Figure 12B:
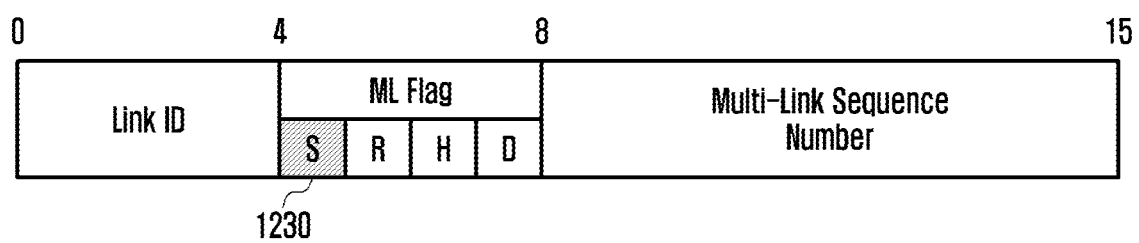
FIGS. 12B, 12C, and 12D are diagrams illustrating ML information formats according to an embodiment of the present invention.
Figure 12C:
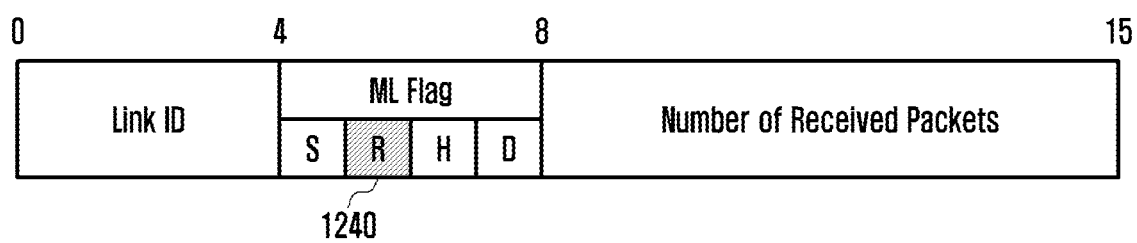
Figure 12D:
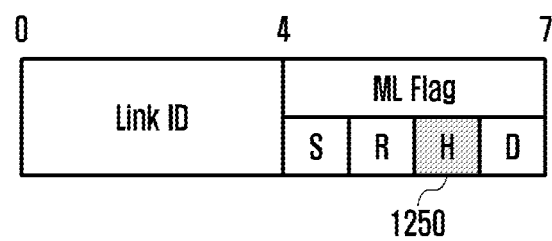

In the present invention, 3 information packet formats are defined as shown in FIGS. 12B, 12C, and 12D and they include a unique link ID and 4 1-bit ML flags each. The ML flags are referred to as S, R, H, and D flags (S and R flags for data packet, particularly, R flag for TCP ACK packet). The H flag is used for handover associated with a UDP flow, and D flag is used for dummy packets.

In detail, the ML information of 2 bytes is included for the TCP flow, and the SMLM (which is interchangeably referred to as ML-GW and MLPDCP) may set the ML information as shown in FIG. 12B for the case of transmitting a TCP data packet. At this time, the S flag 1230 may be set to 1 and followed by an ML sequence number field. The SMLM may be set the R flag 1240 to 1 for indicating TCP ACK packet transmission, which is followed by a "number of received packets" field for use in packet scheduling by the transmitter as shown in FIG. 12C. As shown in FIG. 12D, the D flag 1250 is used for indicating the dummy ML information packet for TCP flow. The receiver transmits no ML information during the receipt of the dummy ML packet.

Figure 13A:
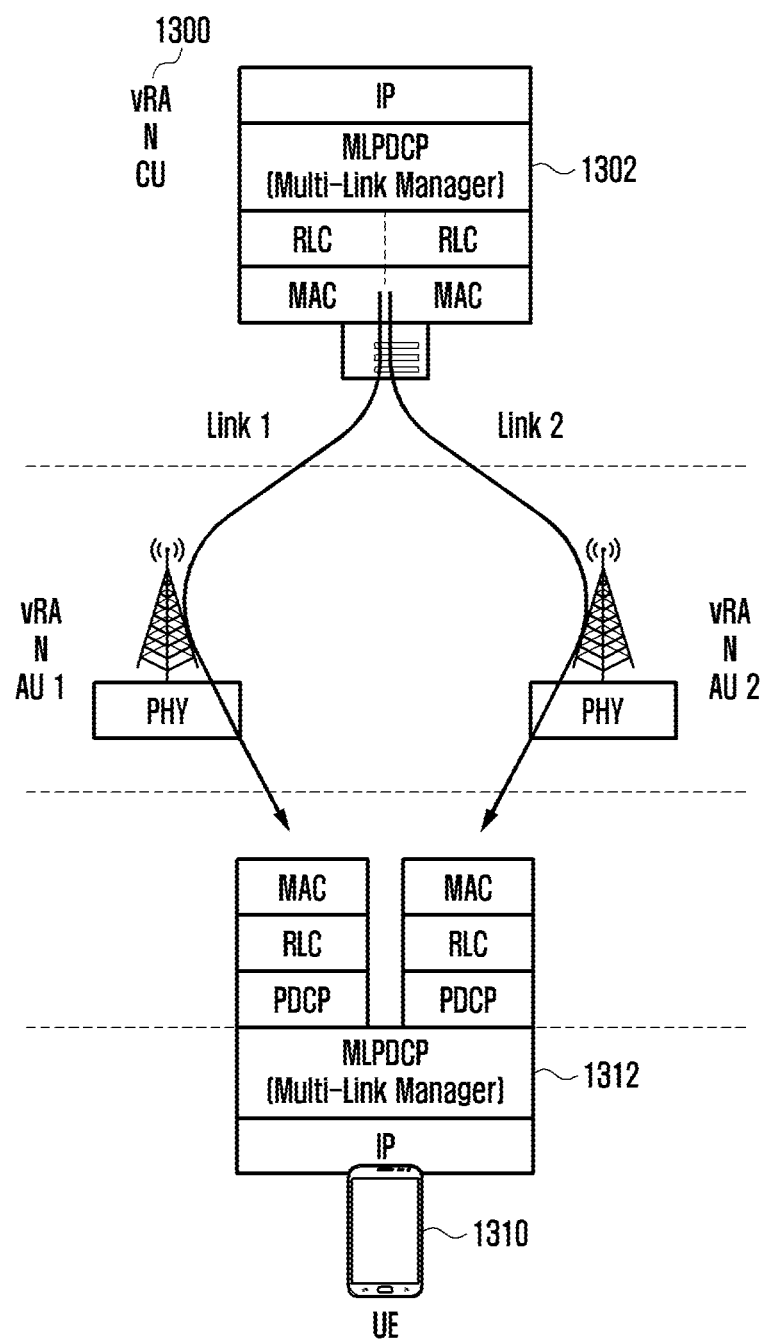
FIGS. 13A, 13B, and 13C are diagrams for explaining a method for transmitting/receiving a TCP flow based on ML information.
Figure 13B:
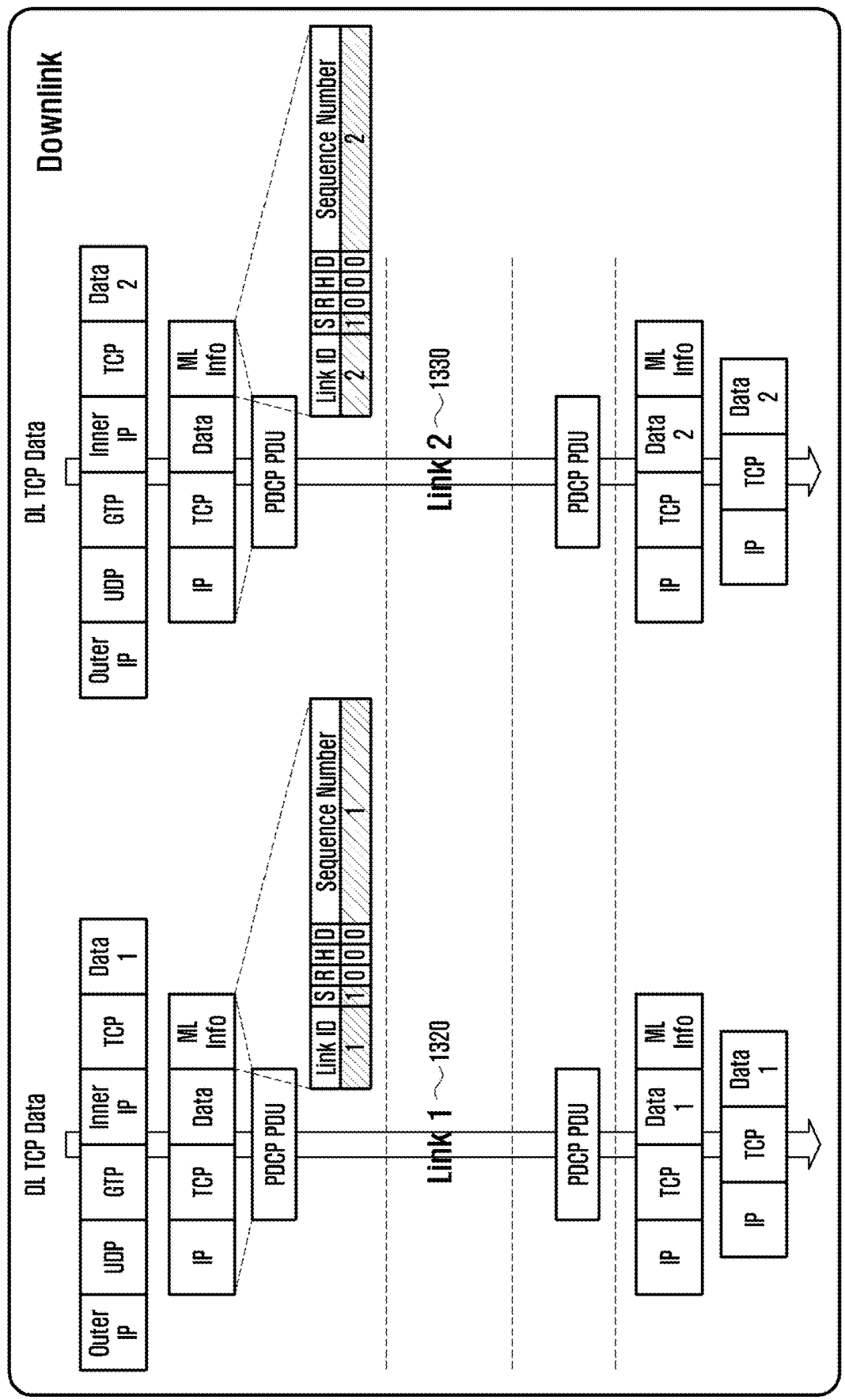
Figure 13C:
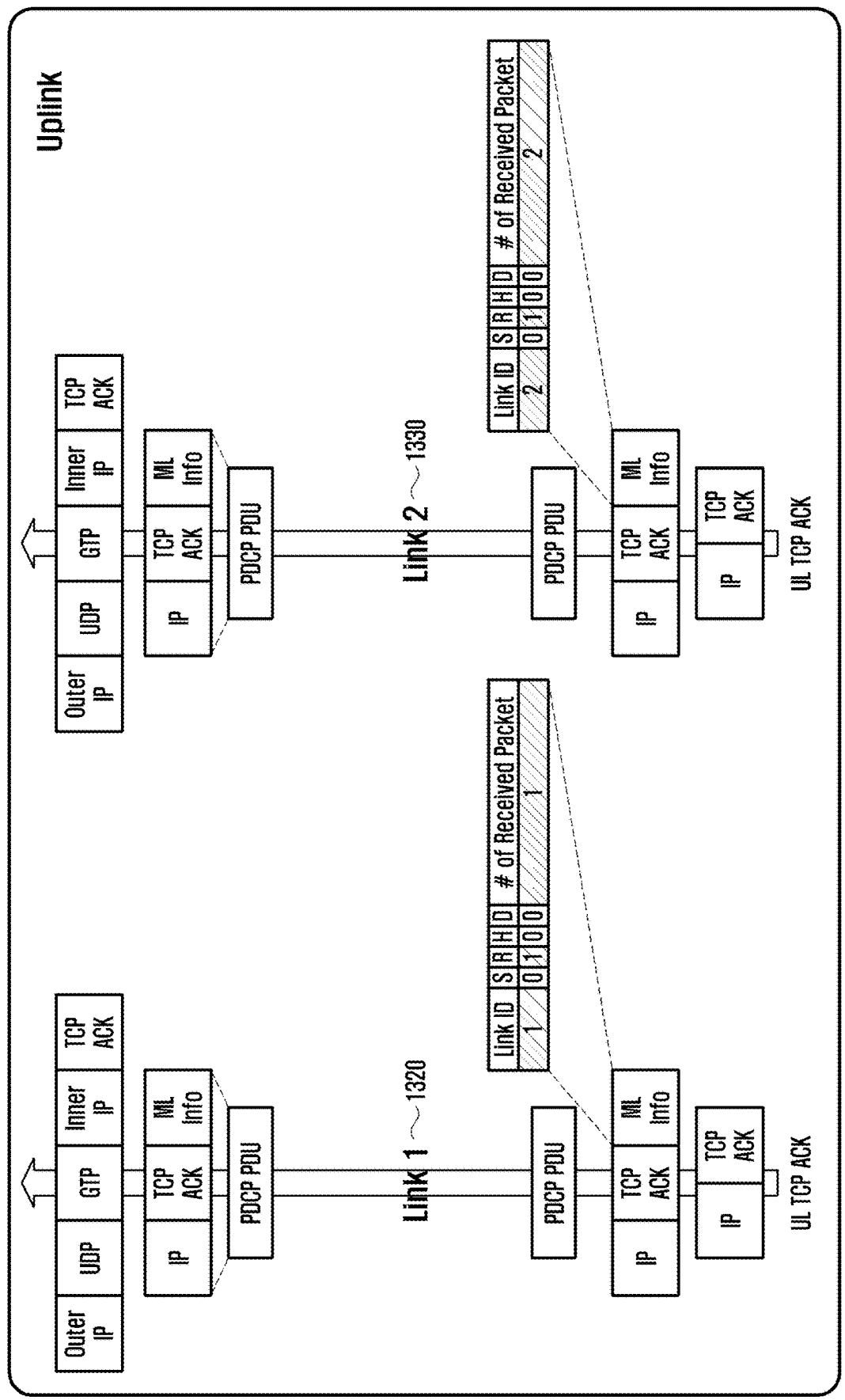

FIGS. 13A, 13B, and 13C are diagrams for explaining a method for transmitting/receiving a TCP flow based on ML information. In reference to FIG. 13A, a control unit (CU or understood as gateway) 1300 may include a multilink PDCP (MLPDCH) layer 1302 which is newly configured between the IP layer and the PDCH layer. The CU may transmit data packets to the UE 1300 over multiple links via multiple accept units (AUs or understood as base stations). Also, the UE is configured with a MLPDCP layer 1312 between the PDCP layer and the IP layer. In reference to FIG. 13B, the ML information included in the downlink data packet being delivered from the CU to the UE over link 1 1320 may be configured as follows. The link ID may be set to 1, the S flag is set to 1, and the sequence number may be set to 1. Also, the ML information included in the downlink data packet being delivered from the CU to the UE over link 2 1330 may be configured as follows. The link ID may be set to 2, the S flag may be set to 1, and the sequence number may be set to 2. In reference to FIG. 13C, uplink TCP ACK packets being transmitted from the UE to the CU may be delivered over the respective links. In detail, the ML information included in the TCP ACK packet being delivered over link 1 1320 may include the link ID set to 1, the R flag set to 1, and the "number of received packets" field set to 1. Also, the ML information included in the TCP ACK packet being delivered over link2 1330 may include the link ID set to 2, the R flag set to 1, and the "number of received packets" field set to 1.

Figure 13D:
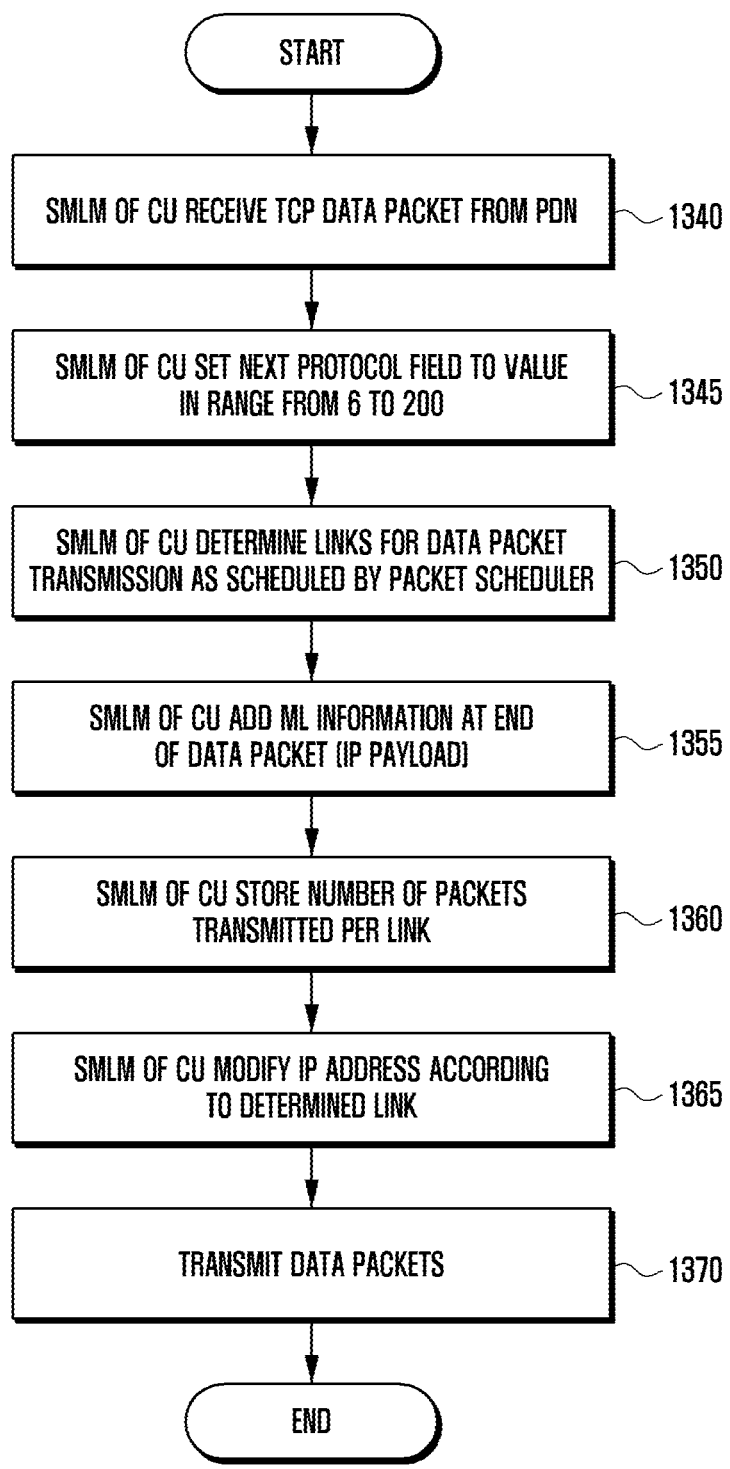
FIG. 13D is a flowchart illustrating a TCP data packet transmission method of a SMLM of a CU.

FIG. 13D is a flowchart illustrating a TCP data packet transmission method of a SMLM of a CU. In reference to FIG. 13D, the SMLM of the CU receives a TCP data packet from a PDN at step 1340. Next, the SMLM sets, at step 1345, the next protocol filed to a value selected in the range from 6 to 200 and determine, at step 1350, a link for delivering the data packet scheduled by the packet scheduler. Next, the SMLM adds, at step 1355, ML information at the end of the data packet, stores, at step 1360, the number of packets delivered per link, and modifies, at step 1365, the IP address of the data packet (IP payload) according to the link determined for the packet delivery. Next, the SLML transmits the data packet at step 1370.

Figure 13E:
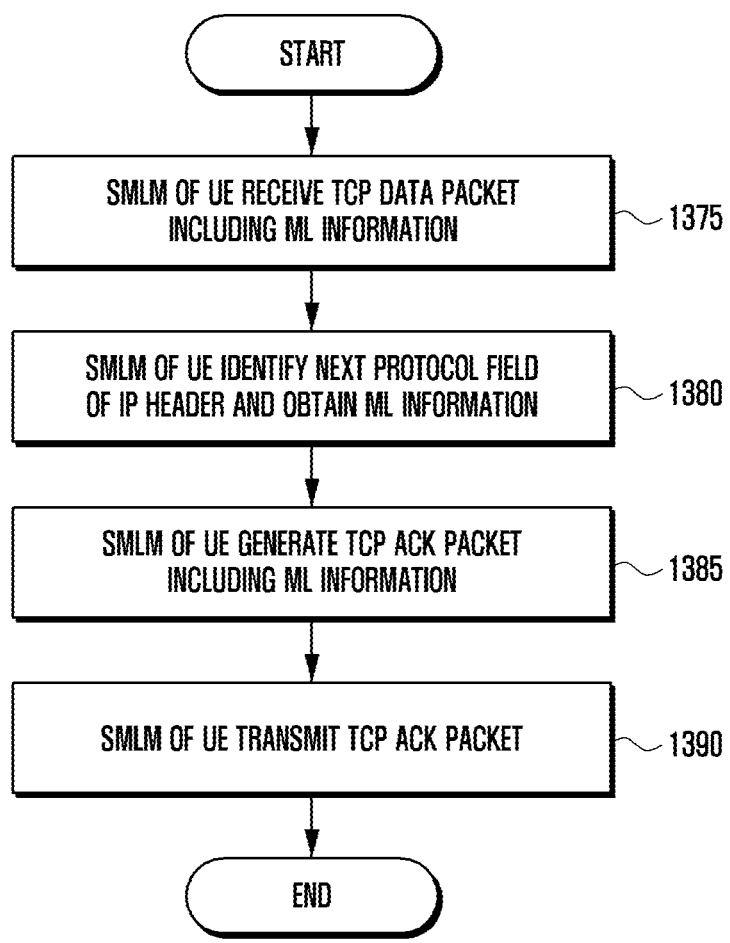
FIG. 13E is a flowchart illustrating a method for an SMLM of a UE to receive TCP data packets and transmit a corresponding TCP ACK packet.

FIG. 13E is a flowchart illustrating a method for an SMLM of a UE to receive TCP data packets and transmit a corresponding TCP ACK packet. In reference to FIG. 13E, the SMLM of the UE receives a TCP data packet including ML information at step 1375. The SMLM checks the next protocol field of the IP header for type of included ML information and obtain the ML information at step 1380. Next, the SMLM generates a TCP ACK packet corresponding to the TCP data packet at step 1385, the TCP ACK packet including the ML information, and transmits the TCP ACK packet at step 1390.

Figure 14A:
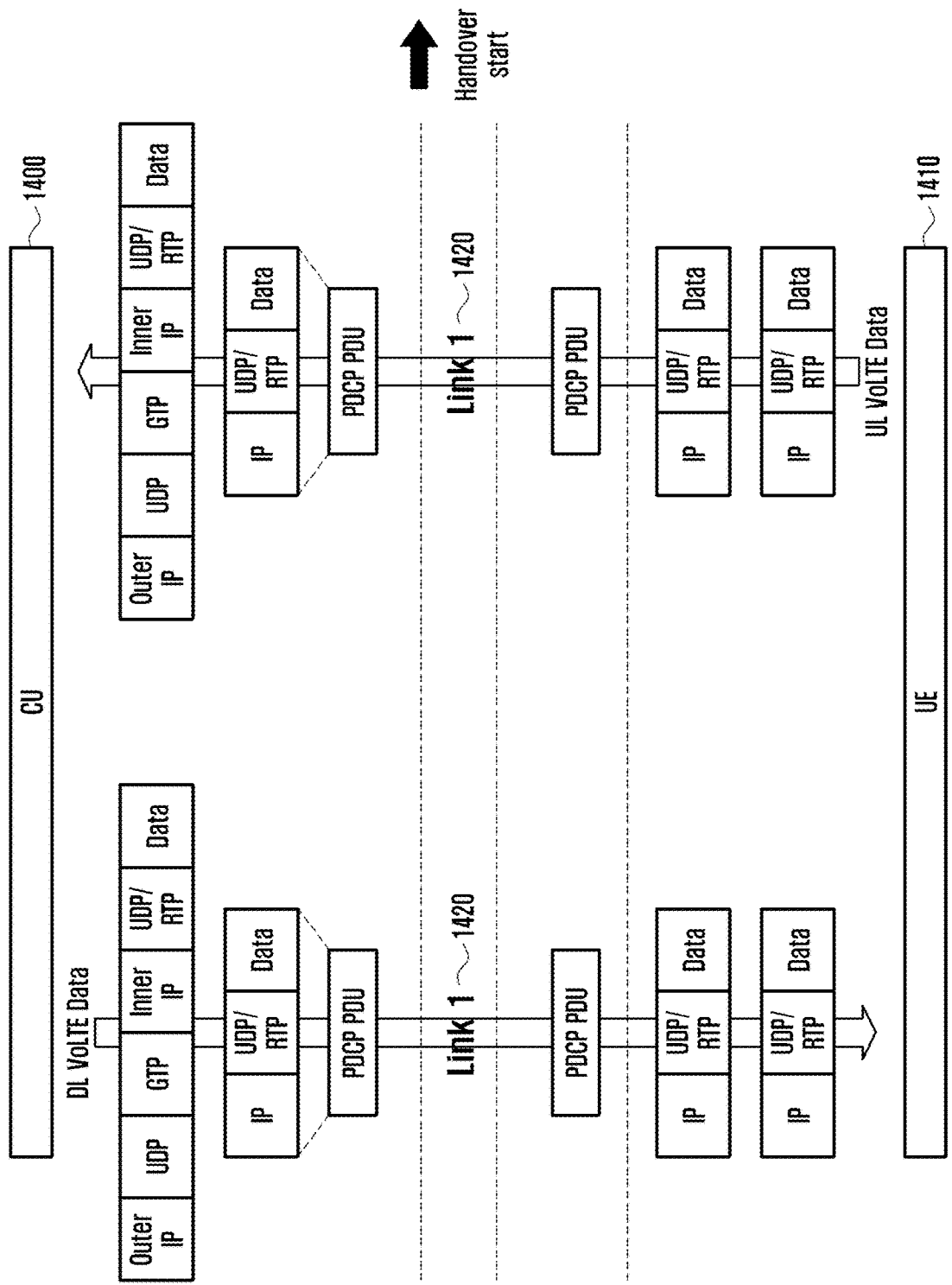
FIGS. 14A, 14B, and 14C are diagrams illustrating a link switching method for use in handover based on ML information.
Figure 14B:
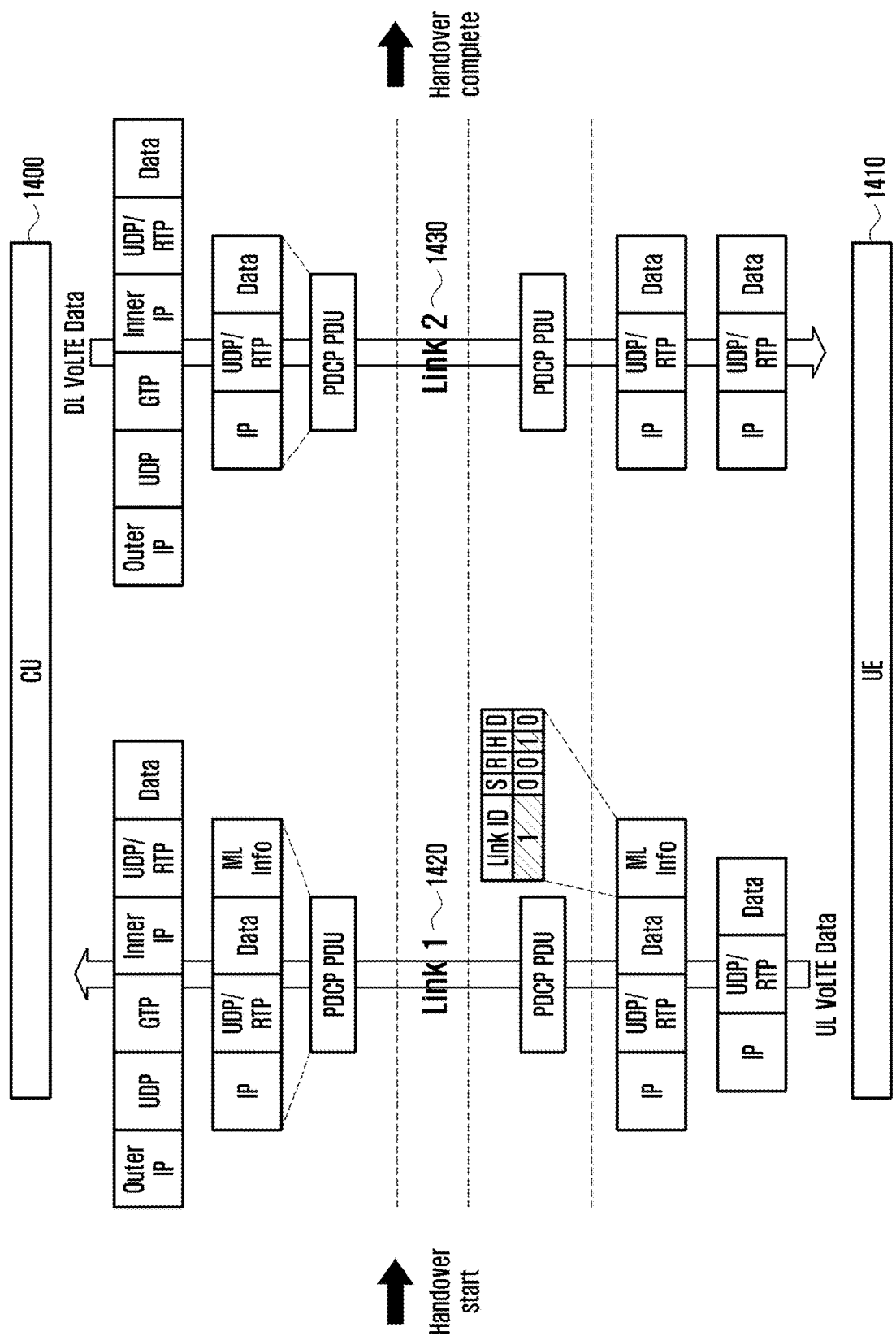
Figure 14C:
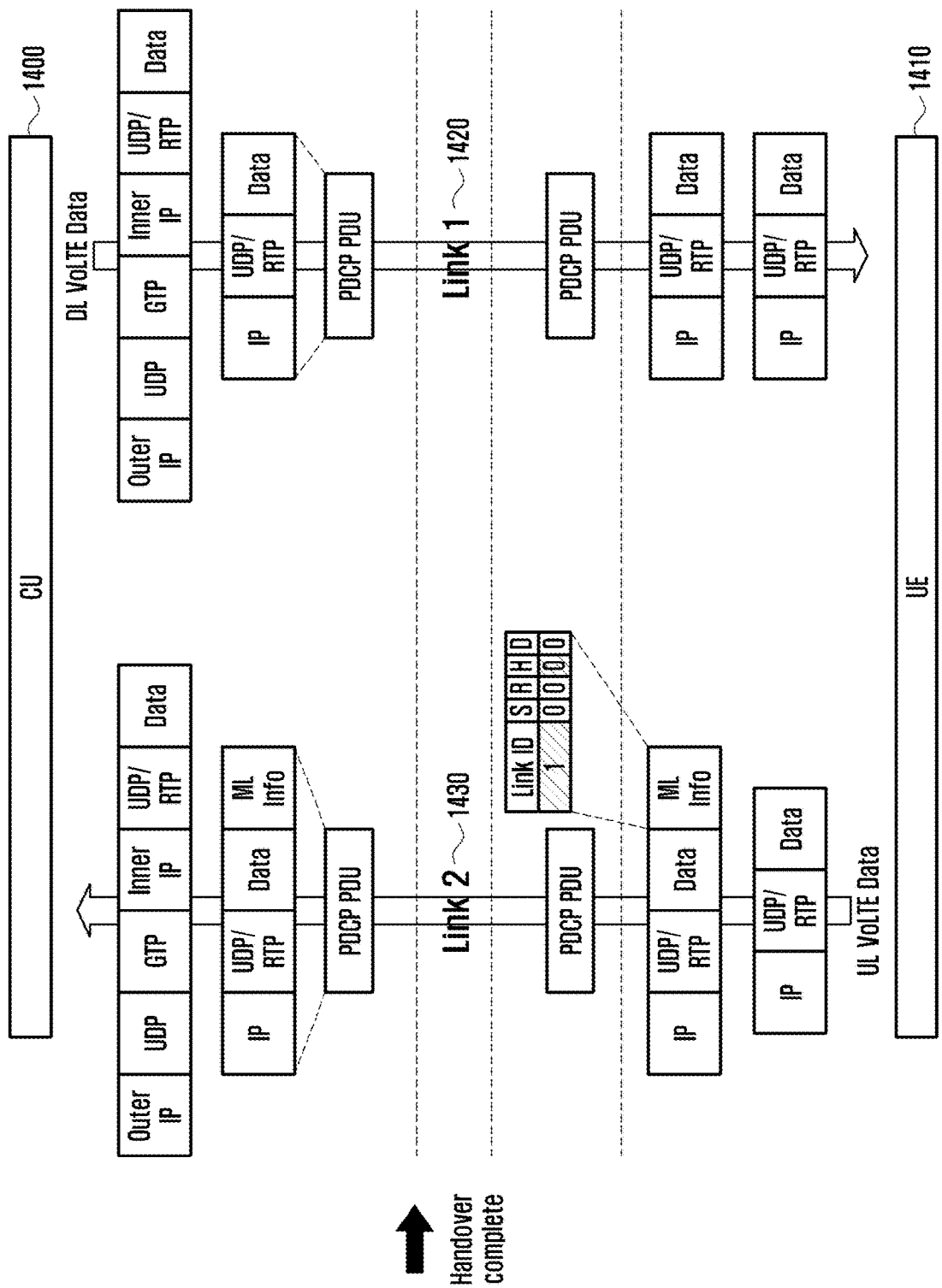

FIGS. 14A, 14B, and 14C are diagrams illustrating a link switching method for use in handover based on ML information. In reference to FIG. 14A, the SMLMs of the CU 1400 and the UE 1410 are exchanging VoLTE packets over link 1 1420. Here, the VoLTE packet includes no ML information. Hover, if a handover is initiated, the SMLM of the UE 1410 transmits an uplink VoLTE packet including the ML information. The ML information may include the link ID of link 1 on which the VoLTE packets are being transmitted/received and the H flag set to 1. Upon receipt of the VoLTE packet, the CU may transmit the downlink VoLTE packet over link 2 which is not involved in the handover. If the handover is completed, the UE may transmit to the CU the uplink VoLTE packet including the ML information including the link ID set to 1 and the H flag unconfigured (0)

in the format as shown in FIG. 12C; upon receipt of this packet, the CU may transmit the VoLTE packet over link 1.

Figure 14D:
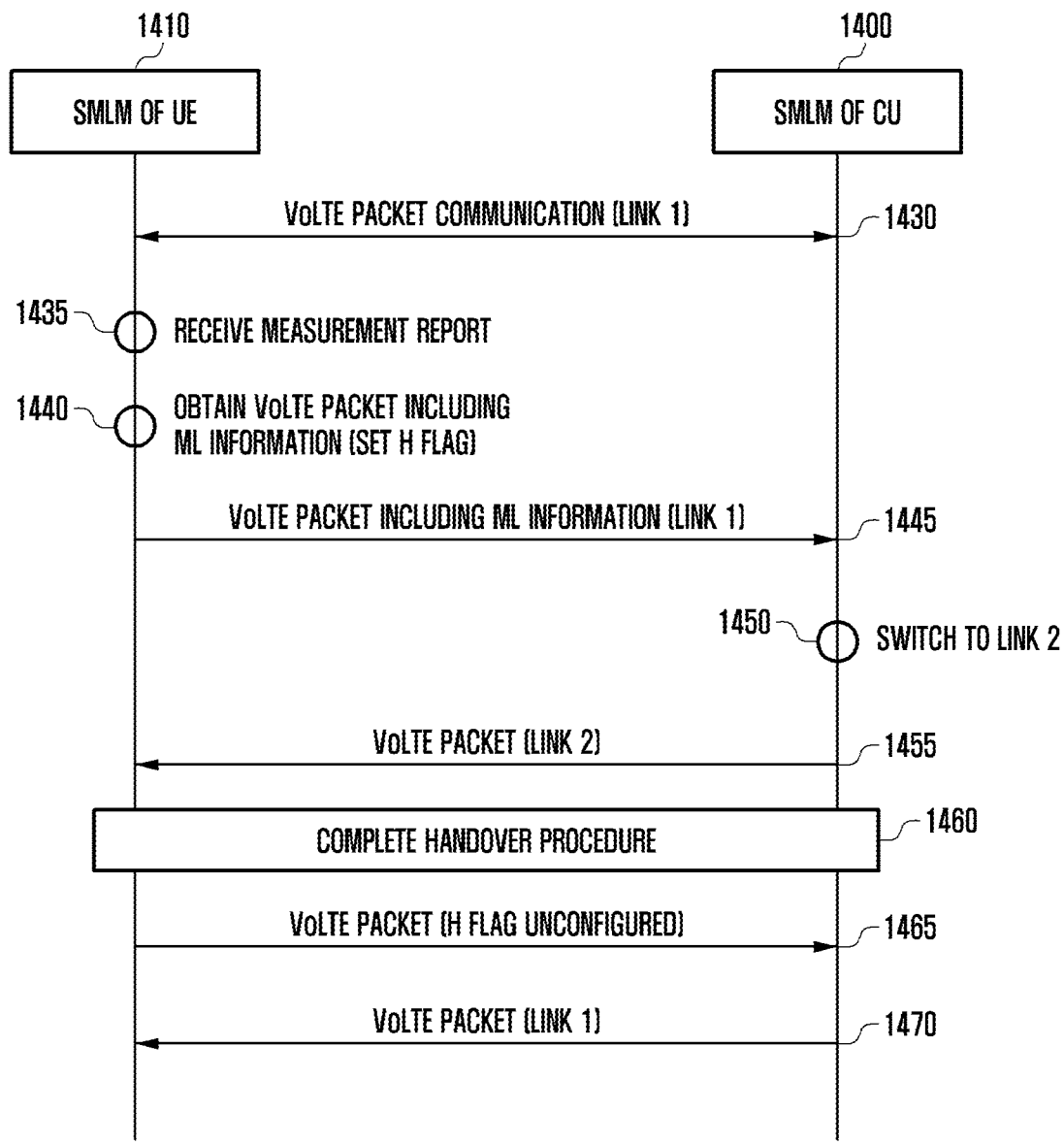
FIG. 14D is a signal flow diagram illustrating an ML information-based link switching method for VoLTE packet transmission between a CU and a UE.

FIG. 14D is a signal flow diagram illustrating an ML information-based link switching method for VoLTE packet transmission between a CU and a UE. Although the drawing is directed to a VoLTE packet communication, the proposed method is applicable to a UDP packet communication. In reference to FIG. 14D, the SMLM 1410 of the UE and the SMLM 1400 of the CU are communicating VoLTE packets over link 1 at step 1430. During the preparation for handover of link 1, the SMLM receives a measurement report message from the LTE RRC layer at step 1435. Next, the SMLM of the UE generates a VoLTE packet including ML information at step 1440 and transmits the VoLTE packet at step 1445. The ML information may include a link ID of the current link and the H flag set to 1. Such VoLTE packets may be transmitted until the handover is completed. Upon receipt of the VoLTE packet including the ML information, the SMLM of the CU switch the downlink to from the current link to another link available for transmission at step 1450 and transmitting the downlink VoLTE packets to the UE over link 2 at step 1455. If the handover procedure is completed at step 1460, the UE transmits VoLTE packets including the ML information at step 1465, the ML information including the original link ID (link 1 in this case) and the H flag unconfigured (set to 0). Upon receipt of the VoLTE packet, the CU switches the downlink back to link 1 and transmits the downlink VoLTE packets to the UE over link 1 at step 1470.

The invention claimed is:

1. A packet transmission method of a multilink gateway, the method comprising:
receiving, from a packet data network gateway, data packets over an Internet Protocol (IP) layer;
receiving, from a terminal, multilink transmission information on respective wireless communication links available for the terminal;
scheduling the data packets based on the multilink transmission information; and
transmitting the data packets to respective access points corresponding to the respective wireless communication links over the IP layer,
wherein the data packets are transmitted to the terminal from the respective access points via the respective wireless communication links.

2. The method of claim 1, further comprising:
determining whether the terminal supports multilink transmission with a single IP address.

3. The method of claim 1, wherein scheduling the data packets comprises:
calculating weights for the respective wireless communication links based on state information of the respective wireless communication links; and
scheduling the data packets based on the weights.

4. The method of claim 1, wherein the data packets include multilink information indicating a link state of a wireless communication link among the respective wireless communication links.

5. The method of claim 4, wherein the multilink information is located at an end of the data packets.

6. The method of claim 4, wherein the multilink information comprises link identification information and at least one 1-bit flag indicating a type of the multilink information.

7. The method of claim 4, wherein the data packets comprises a next protocol field indicating a length of the multilink information.

8. A multilink gateway for transmitting packets, the multilink gateway comprising:
a transceiver configured to transmit and receive a signal; and
a controller configured to control to:
receive, from a packet data network gateway, data packets over an Internet Protocol (IP) layer,
receive, from a terminal, multilink transmission information on respective wireless communication links available for the terminal,
schedule the data packets based on the multilink transmission information, and
transmit the data packets to respective access points corresponding to the respective wireless communication links over the IP layer,
wherein the data packets are transmitted to the terminal from the respective access points to the respective wireless communication links.

9. The multilink gateway of claim 8, wherein the controller is configured to control to determine whether the terminal supports multilink transmission with a single IP address.

10. The multilink gateway of claim 8, wherein the controller is configured to control to calculate weights for the respective wireless communication links based on state information of the respective wireless communication links, and
schedule the data packets based on the weights.

11. The multilink gateway of claim 8, wherein the data packets include multilink information indicating a link state of a wireless communication link among the respective wireless communication links.

12. The multilink gateway of claim 11, wherein the multilink information is located at an end of the data packets.

13. The multilink gateway of claim 11, wherein the multilink information comprises link identification information and at least one 1-bit flag indicating a type of the multilink information.

14. The multilink gateway of claim 11, wherein the data packets comprises a next protocol field indicating a length of the multilink information.

* * * * *